US008560270B2

(12) United States Patent
Chu

(10) Patent No.: US 8,560,270 B2
(45) Date of Patent: Oct. 15, 2013

(54) RATIONAL APPROXIMATION AND CONTINUED-FRACTION APPROXIMATION APPROACHES FOR COMPUTATION EFFICIENCY OF DIFFRACTION SIGNALS

(75) Inventor: Hanyou Chu, Palo Alto, CA (US)

(73) Assignees: Tokyo Electron Limited, Tokyo (JP); KLA—Tencor Corporation, Milpitas, CA (US)

( * ) Notice: Subject to any disclaimer, the term of this patent is extended or adjusted under 35 U.S.C. 154(b) by 594 days.

(21) Appl. No.: 12/331,192

(22) Filed: Dec. 9, 2008

(65) Prior Publication Data
US 2010/0145655 A1 Jun. 10, 2010

(51) Int. Cl.
G06F 3/01 (2006.01)
G06F 3/00 (2006.01)
G06F 3/06 (2006.01)
G06F 13/10 (2006.01)

(52) U.S. Cl.
USPC ............ 702/182; 702/179; 702/183; 702/186

(58) Field of Classification Search
USPC ............ 702/85, 97, 104, 127, 155, 179, 182, 702/189; 356/601–603, 636; 369/121; 700/110; 703/6
See application file for complete search history.

(56) References Cited

U.S. PATENT DOCUMENTS

| | | | |
|---|---|---|---|
| 5,313,398 A * | 5/1994 | Rohrer et al. .................... 703/14 |
| 6,216,063 B1 * | 4/2001 | Lind et al. ......................... 701/3 |
| 6,842,261 B2 * | 1/2005 | Bao et al. ....................... 356/636 |
| 7,031,894 B2 * | 4/2006 | Niu et al. ........................... 703/6 |
| 7,184,385 B2 * | 2/2007 | Hendriks ................. 369/112.08 |
| 7,292,517 B2 * | 11/2007 | Hendriks et al. ......... 369/112.26 |
| 7,428,060 B2 * | 9/2008 | Jin et al. ......................... 356/601 |
| 8,078,446 B2 * | 12/2011 | Stevens et al. ................... 703/14 |
| 2004/0267397 A1 * | 12/2004 | Doddi et al. ................... 700/110 |
| 2006/0187468 A1 * | 8/2006 | Bischoff et al. ............... 356/601 |
| 2007/0153274 A1 * | 7/2007 | Van Der Aa et al. .......... 356/401 |

OTHER PUBLICATIONS

Chu, Hanyou, "Finite Difference Approach to Optical Scattering of Gratings," Advanced Characterization Techniques for Optics, Semiconductors, and Nanotechnologies, Proceedings of the SPIE, vol. 5188, Nov. 2003, pp. 358-370.

Jiang, P. L., et al., "Forward solve algorithms for optical critical dimension metrology," Metrology, Inspection, and Process Control for Microlithography XXII, Proceedings of the SPIE, vol. 6922, Apr. 2008, pp. 692210-692210-7.

Shen, Jie, "Efficient Spectral-Galerkin Method I. Direct Solvers for the Second and Fourth Order Equations Using Legendre Polynomials," Society for Industrial and Applied Mathematics, Siam J. Sci. Comput., vol. 15, No. 6, Nov. 1994, pp. 1489-1505.

* cited by examiner

*Primary Examiner* — Marc Armand
*Assistant Examiner* — Felix Suarez
(74) *Attorney, Agent, or Firm* — Blakely Sokoloff Taylor Zafman LLP

(57) ABSTRACT

Methods and apparatuses for improving computation efficiency for diffraction signals in optical metrology are described. The method includes simulating a set of diffraction orders for a structure. A set of diffraction efficiencies is determined for the set of diffraction orders. A rational approximation or a continued-fraction approximation is applied to the set of diffraction efficiencies to obtain a rationally approximated set of diffraction efficiencies or a continued-fraction approximated set of diffraction efficiencies, respectively. A simulated spectrum is then provided.

28 Claims, 8 Drawing Sheets

RATIONAL APPROXIMATION AND CONTINUED-FRACTION APPROXIMATION APPROACHES FOR COMPUTATION EFFICIENCY OF DIFFRACTION SIGNALS

TECHNICAL FIELD

Embodiments of the present invention are in the field of optical metrology, and, more particularly, relate to computation efficiency for diffraction signals in optical metrology.

BACKGROUND

For the past several years, a rigorous couple wave approach (RCWA) and similar algorithms have been widely used for the study and design of diffraction structures. In the RCWA approach, the profiles of periodic structures are approximated by a given number of sufficiently thin planar grating slabs. Specifically, RCWA involves three main operations, namely, the Fourier expansion of the field inside the grating, calculation of the eigenvalues and eigenvectors of a constant coefficient matrix that characterizes the diffracted signal, and solution of a linear system deduced from the boundary matching conditions. RCWA divides the problem into three distinct spatial regions: 1) the ambient region supporting the incident plane wave field and a summation over all reflected diffracted orders, 2) the grating structure and underlying non-patterned layers in which the wave field is treated as a superposition of modes associated with each diffracted order, and 3) the substrate containing the transmitted wave field.

The accuracy of the RCWA solution depends, in part, on the number of terms retained in the space-harmonic expansion of the wave fields, with conservation of energy being satisfied when there are no absorbing materials present in the entire structure for a particular wavelength. The number of terms retained is a function of the number of diffraction orders considered during the calculations. Efficient generation of a simulated diffraction signal for a given hypothetical profile involves selection of the optimal set of diffraction orders at each wavelength for both transverse-magnetic (TM) and/or transverse-electric (TE) components of the diffraction signal. Mathematically, the more diffraction orders selected, the more accurate the simulations. However, the higher the number of diffraction orders, the more computation is required for calculating the simulated diffraction signal. Moreover, the computation time is a nonlinear function of the number of orders used, and increases dramatically when the number of orders is increased.

SUMMARY OF THE INVENTION

An aspect of the invention includes a method for improving computation efficiency for diffraction signals in optical metrology. A set of diffraction orders is simulated for a structure. A set of diffraction efficiencies is determined for the set of diffraction orders. A rational approximation is applied to the set of diffraction efficiencies to obtain a rationally approximated set of diffraction efficiencies. A simulated spectrum is then provided based on the rationally approximated set of diffraction efficiencies. In one embodiment, determining the set of diffraction efficiencies for the set of diffraction orders includes using modified Legendre polynomial high-order finite element discretization.

Another aspect of the invention also includes a method for improving computation efficiency for diffraction signals in optical metrology. A set of diffraction orders is simulated for a structure. A set of diffraction efficiencies is determined for the set of diffraction orders. A continued-fraction approximation is applied to the set of diffraction efficiencies to obtain a continued-fraction approximated set of diffraction efficiencies. A simulated spectrum is then provided based on the continued-fraction approximated set of diffraction efficiencies. In one embodiment, determining the set of diffraction efficiencies for the set of diffraction orders includes using modified Legendre polynomial high-order finite element discretization.

Another aspect of the invention includes a computer-readable medium having stored thereon a set of instructions. The set of instructions is included to perform a method including simulating a set of diffraction orders for a structure. A set of diffraction efficiencies is determined for the set of diffraction orders. A rational approximation is applied to the set of diffraction efficiencies to obtain a rationally approximated set of diffraction efficiencies. A simulated spectrum is then provided based on the rationally approximated set of diffraction efficiencies.

Another aspect of the invention also includes a computer-readable medium having stored thereon a set of instructions. The set of instructions is included to perform a method including simulating a set of diffraction orders for a structure. A set of diffraction efficiencies is determined for the set of diffraction orders. A continued-fraction approximation is applied to the set of diffraction efficiencies to obtain a continued-fraction approximated set of diffraction efficiencies. A simulated spectrum is then provided based on the continued-fraction approximated set of diffraction efficiencies.

DETAILED DESCRIPTION

Figure 1:
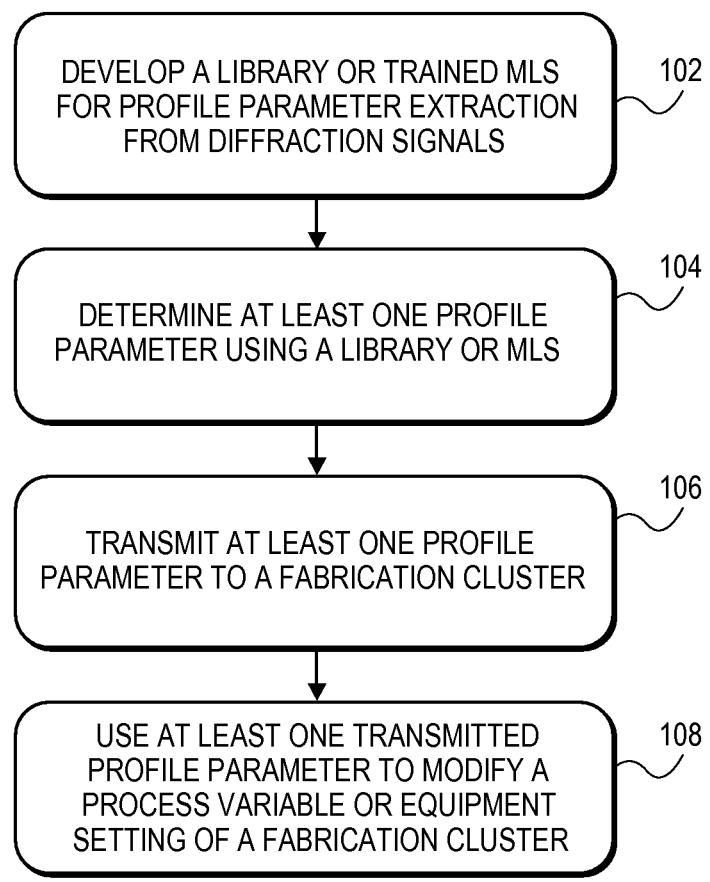
FIG. 1 depicts a flowchart representing an example of a series of operations for determining and utilizing profile parameters for automated process and equipment control, in accordance with an embodiment of the present invention.

Methods and apparatuses for improving computation efficiency for diffraction signals in optical metrology are described herein. In the following description, numerous specific details are set forth, such as specific methods of obtaining diffraction efficiencies, in order to provide a thorough understanding of the present invention. It will be apparent to one skilled in the art that the present invention may be practiced without these specific details. In other instances, well-known processing operations, such as fabricating stacks of patterned material layers, are not described in detail in order to not unnecessarily obscure the present invention. Furthermore, it is to be understood that the various embodiments shown in the Figures are illustrative representations and are not necessarily drawn to scale.

Disclosed herein is a method for improving computation efficiency for diffraction signals in optical metrology. The method includes simulating a set of diffraction orders for a structure and then determining a set of diffraction efficiencies for the set of diffraction orders. In one embodiment, a rational approximation is applied to the set of diffraction efficiencies to obtain a rationally approximated set of diffraction efficiencies. A simulated spectrum is then provided based on the rationally approximated set of diffraction efficiencies. In another embodiment, a continued-fraction approximation is applied to the set of diffraction efficiencies to obtain a continued-fraction approximated set of diffraction efficiencies. A simulated spectrum is then provided based on the continued-fraction approximated set of diffraction efficiencies. In a specific embodiment, determining the set of diffraction efficiencies for the set of diffraction orders includes using modified Legendre polynomial high-order finite element discretization. In another specific embodiment, determining the set of diffraction efficiencies for the set of diffraction orders includes using a rigorous coupled wave approach.

In an embodiment, orders of a diffraction signal are simulated as being derived from a periodic structure. The zeroth order represents a diffracted signal at an angle equal to the angle of incidence of a hypothetical incident beam, with respect to the normal N of the periodic structure. Higher diffraction orders are designated as +1, +2, +3, −1, −2, −3, etc. for two-dimensional structures or as (x, y), where both x and y are integers other than zero or if x=0 then y is an integer other than zero and if y=0 then x is an integer other than zero, for three-dimensional structures. In an embodiment, other orders known as evanescent orders are also considered. In accordance with an embodiment of the present invention, a simulated diffraction signal is generated for use in optical metrology. In one embodiment, efficient generation of a simulated diffraction signal for a given structure profile involves providing sufficient diffraction information without overly increasing the computational operations to perform diffraction signal simulations. In accordance with an embodiment of the present invention, a set of diffraction efficiencies is determined for a set of diffraction orders. In an embodiment, a diffraction efficiency refers to the ratio between a reflected (diffracted) signal energy and a corresponding incident signal energy. In one embodiment, the ratio between a reflected field and a corresponding incident field is calculated. This may be referred to as reflectivity, e.g., transmission coefficients for transmitted signals for multilayered systems. In an embodiment, a rigorous definition of the diffraction efficiency coefficient is $P\{z, \text{diffracted}\}/P\{z, \text{incident}\}$, where P is the Poynting vector and z indicates the z-component.

In an embodiment, a forward simulation algorithm for diffraction patterns generated from three-dimensional structures is very time consuming to perform. For example, the use of a diagonalization matrix without further optimization results in a very costly calculation process and typically dominates the entire computation. However, in accordance with an embodiment of the present invention, a rational approximation is applied to a set of diffraction efficiencies, determined for a simulated set of diffraction orders, to obtain a rationally approximated set of diffraction efficiencies. A simulated spectrum is then provided based on the rationally approximated set of diffraction efficiencies. In accordance with another embodiment of the present invention, a continued-fraction approximation is applied to a set of diffraction efficiencies, determined for a simulated set of diffraction orders, to obtain a continued-fraction approximated set of diffraction efficiencies. A simulated spectrum is then provided based on the continued-fraction approximated set of diffraction efficiencies. The simulated spectrum is then compared to a sample spectrum, e.g. a measured spectrum obtained from an actual sample measurement. In accordance with another embodiment of the present invention, high order finite element or rational approximations are used to replace diagonalization in RCWA to achieve faster forward computations.

In an embodiment, calculations based on a rational approximation approach or a continued-fraction approximation approach are indicative of profile parameters for a patterned film, such as a patterned semiconductor film or photoresist layer, and are used for calibrating automated processes or equipment control. FIG. 1 depicts a flowchart 100 representing an example of a series of operations for determining and utilizing profile parameters for automated process and equipment control, in accordance with an embodiment of the present invention.

Referring to operation 102 of flowchart 100, a library or trained machine learning systems (MLS) is developed to extract profile parameters from a set of measured diffraction signals. In operation 104, at least one profile parameter of a structure is determined using the library or the trained MLS. In operation 106, the at least one profile parameter is transmitted to a fabrication cluster to perform a processing operation, where the processing operation is executed in the semiconductor manufacturing process flow either before or after measurement operation 104 is made. In operation 108, the at least one transmitted profile parameter is used to modify a process variable or equipment setting for the processing operation performed by the fabrication cluster. For a more detailed description of machine learning systems and algorithms, see U.S. patent application Ser. No. 10/608,300, entitled OPTICAL METROLOGY OF STRUCTURES FORMED ON SEMICONDUCTOR WAFERS USING MACHINE LEARNING SYSTEMS, filed on Jun. 27, 2003, which is incorporated herein by reference in its entirety. For a description of diffraction order optimization for two dimensional repeating structures, see U.S. patent application Ser. No. 11/388,265, entitled OPTIMIZATION OF DIFFRACTION ORDER SELECTION FOR TWO-DIMENSIONAL STRUCTURES, filed on Mar. 24, 2006, which is incorporated herein by reference in its entirety.

Figure 2:
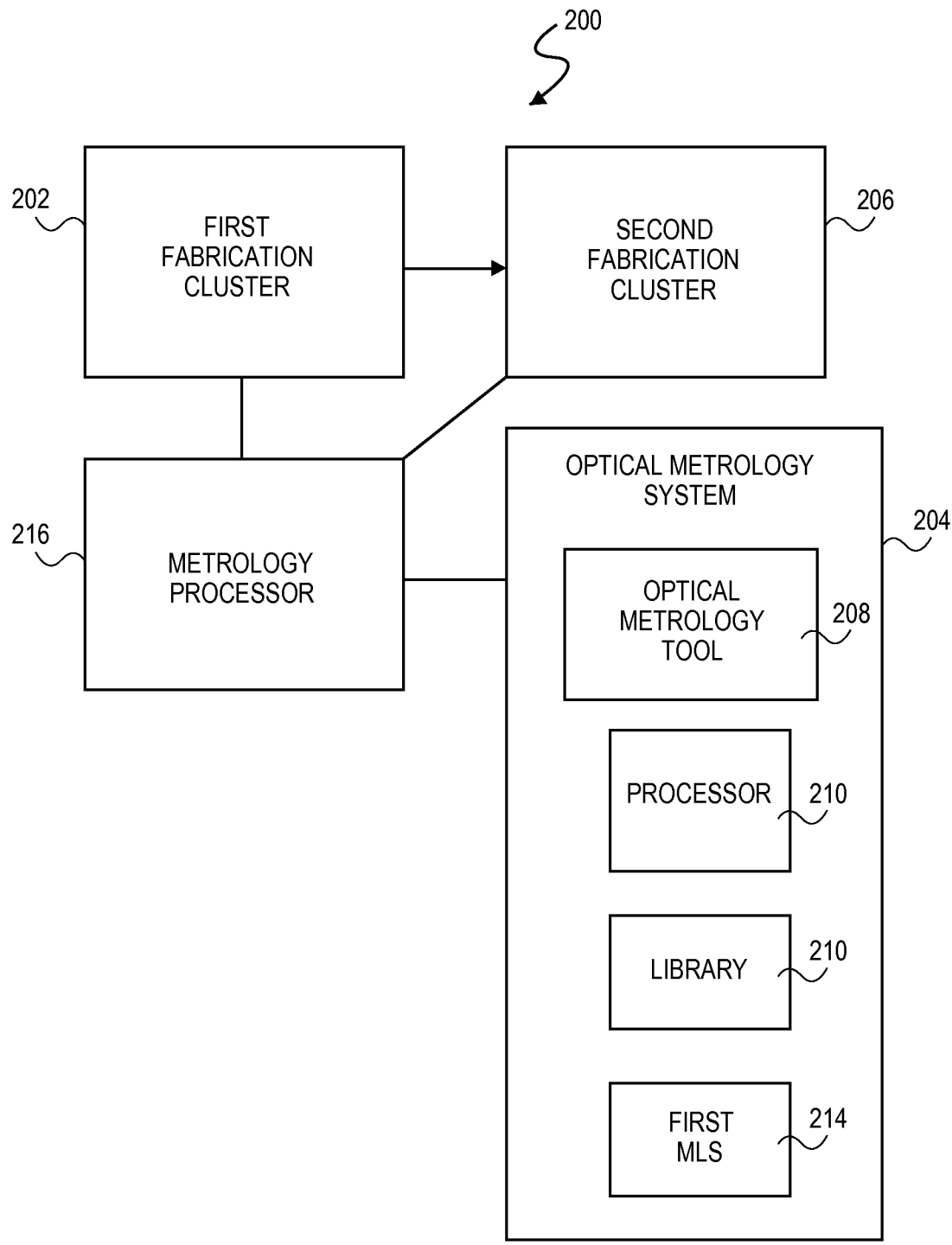
FIG. 2 is a block diagram of an example of a system for determining and utilizing profile parameters for automated process and equipment control, in accordance with an embodiment of the present invention.

FIG. 2 is a block diagram of an example of a system 200 for determining and utilizing profile parameters for automated process and equipment control, in accordance with an embodiment of the present invention. System 200 includes a first fabrication cluster 202 and optical metrology system 204. System 200 also includes a second fabrication cluster 206. Although the second fabrication cluster 206 is depicted in FIG. 2 as being subsequent to first fabrication cluster 202, it should be recognized that, in an embodiment, second fabrication cluster 206 is located prior to first fabrication cluster 202 in system 200 (and, e.g., in the manufacturing process flow).

A photolithographic process, such as exposing and developing a photo-resist layer applied to a wafer, is, in one embodiment, performed using first fabrication cluster 202. In one embodiment, optical metrology system 204 includes an optical metrology tool 208 and processor 210. Optical metrology tool 208 measures a diffraction signal obtained from the structure. If the measured diffraction signal and the simulated diffraction signal match, one or more values of the profile parameters are determined to be the one or more values of the profile parameters associated with the simulated diffraction signal.

In one embodiment, optical metrology system 204 also includes a library 212 with a plurality of simulated diffraction signals and a plurality of values of one or more profile parameters associated with the plurality of simulated diffraction signals. As described above, in an embodiment, the library is generated in advance. In an embodiment, metrology processor 210 compares a measured diffraction signal obtained from a structure to the plurality of simulated diffraction signals in the library. When a matching simulated diffraction signal is found, the one or more values of the profile parameters associated with the matching simulated diffraction signal in the library is assumed to be the one or more values of the profile parameters used in the wafer application to fabricate the structure.

System 200 also includes a metrology processor 216. In one embodiment, processor 210 transmits the one or more values of the one or more profile parameters to metrology processor 216. In an embodiment, metrology processor 216 then adjusts one or more process parameters or equipment settings of first fabrication cluster 202 based on the one or more values of the one or more profile parameters determined using optical metrology system 204. In one embodiment, metrology processor 216 also adjusts one or more process parameters or equipment settings of the second fabrication cluster 206 based on the one or more values of the one or more profile parameters determined using optical metrology system 204. As noted above, in an embodiment, fabrication cluster 206 processes the wafer before or after fabrication cluster 202. In another embodiment, processor 210 trains machine learning system 214 using the set of measured diffraction signals as inputs to machine learning system 214 and profile parameters as the expected outputs of machine learning system 214.

In an aspect of the present invention, high order finite element or rational approximations replace diagonalization in RCWA to enhance efficiency in computations. For example, in critical dimension (CD) metrology, a prevalent algorithm is RCWA based on the diagonalization of complex matrices. The diagonalization dominates the entire computation. Instead, in accordance with an embodiment of the present invention, the need to perform diagonalization is eliminated by using high order finite element discretization or rational approximation which achieves very high accuracy in computations compared to low order finite difference approximations. In an embodiment, the need for finite difference computations of the Jacobian approach in regress analysis, which is very computationally expensive, is also eliminated. In one embodiment, fast and accurate analytic Jacobian computations within the framework of RCWA are carried out based on differentiation of matrix functions, eliminating the need for repeated diagonalization of matrices. Such an approach is both computationally more accurate and efficient as compared to finite difference approximations. In an embodiment, further speed improvement is gained by utilizing rational function approximations. In a specific embodiment, this approach is enhanced by applying a technique of low rank approximation of a set of matrices via rational approximation of the matrix function involved. In one embodiment, analytic Jacobian is carried out for high order finite element or rational approximations and matrix function differentiation is performed to achieve faster Jacobian computations as compared to finite difference approximations. Depending on the problem size, a single Jacobian computation may be a mere fraction of one forward RCWA computation and thus greatly improve regression time in real time CD metrology.

An example of the approach described above initiates from first order differential equation (1):

$$\frac{d}{dz}\begin{pmatrix} E \\ H \end{pmatrix} = \begin{pmatrix} 0, & F \\ -G, & 0 \end{pmatrix}\begin{pmatrix} E \\ H \end{pmatrix}, \quad (1)$$

$$\begin{pmatrix} E(h) \\ H(h) \end{pmatrix} = \begin{pmatrix} 1 & 0 \\ 0 & \frac{1}{Fh} \end{pmatrix} \begin{pmatrix} \cos(Q) & \frac{\sin(Q)}{Q} \\ Q\sin(Q) & \cos(Q) \end{pmatrix} \begin{pmatrix} 1 & 0 \\ 0 & Fh \end{pmatrix} \begin{pmatrix} E(0) \\ H(0) \end{pmatrix}$$

$$Q \equiv (FG)^{1/2}h.$$

where E and H are electric and magnetic fields, and h is a structural layer thickness. Eliminating the magnetic fields, set of equations (2) are obtained:

$$\beta_{l-1}E_{l-1} + (\alpha_{l-1} + \alpha_l)E_l + \beta_l E_{l+1} = 0, \rightarrow \text{block tridiagonal form} \quad (2)$$

$$\alpha - \beta = -\frac{2}{Fh}W, \quad W \equiv \frac{Q/2}{\tan(Q/2)}$$

$$\alpha + \beta = \frac{hG}{2}W^{-1}$$

For incident medium and substrate, $\alpha = -F^{-1}Q$ and $\beta$ is not required. Collecting information from all present structural layers, the problem is formulated in a linear problem Ax=b, where A is a block tridiagonal matrix composed of matrix blocks in terms of $\alpha$s and $\beta$s from all the layers, which are in turn matrix functions of the matrices F and G in each layer.

Figure 3:
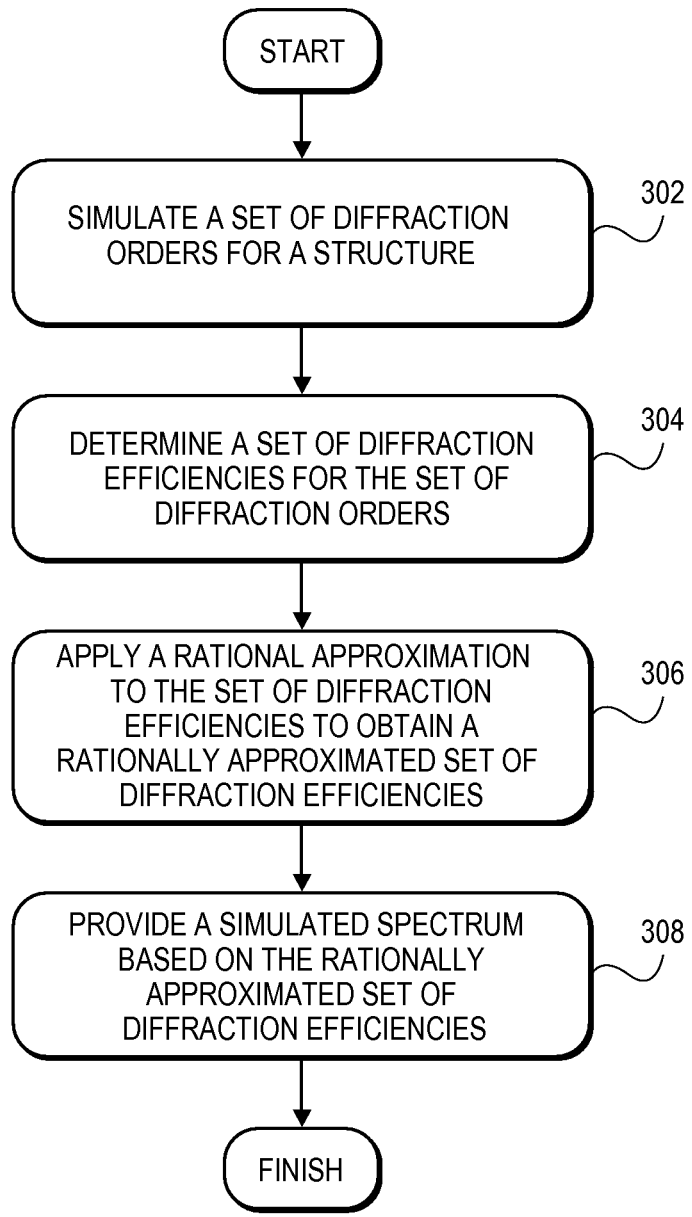
FIG. 3 depicts a flowchart representing an example of a series of operations for improving computation efficiency for simulated diffraction signals in optical metrology, in accordance with an embodiment of the present invention.

In an aspect of the present invention, the computation efficiency for calculations based on diffraction orders, obtained from simulated diffractions signals, is improved for optical metrology applications by using a rational approximation approach when performing the calculations. FIG. 3 depicts a flowchart representing an example of a series of operations for improving computation efficiency for simulated diffraction signals in optical metrology, in accordance with an embodiment of the present invention.

Figure 4A:
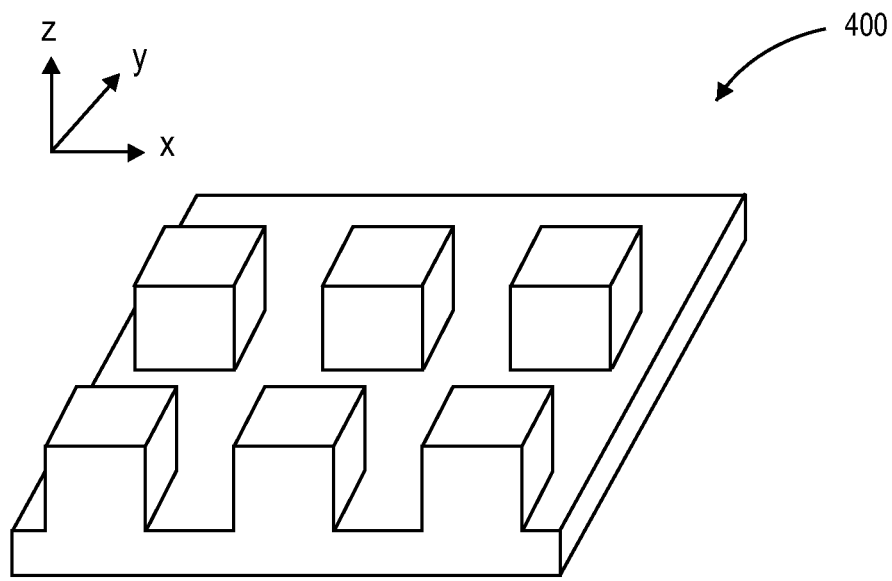
FIG. 4A depicts a periodic grating having a profile that varies in the x-y plane, in accordance with an embodiment of the present invention.
Figure 4B:
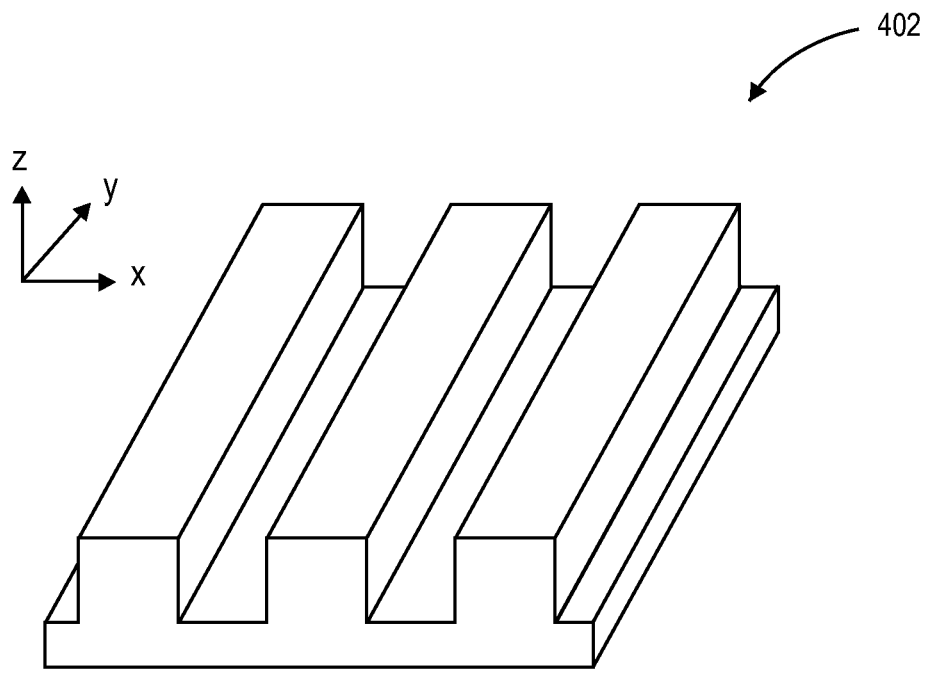
FIG. 4B depicts a periodic grating having a profile that varies in the x-direction but not in the y-direction, in accordance with an embodiment of the present invention.

Referring to operation 302 of flowchart 300, a set of diffraction orders is simulated for a structure. In accordance with an embodiment of the present invention, a set of diffraction orders is simulated for a three-dimensional structure or a two-dimensional structure. The term "three-dimensional structure" is used herein to refer to a structure having an x-y profile that varies in two dimensions in addition to a depth in the z-direction. For example, FIG. 4A depicts a periodic grating 400 having a profile that varies in the x-y plane, in accordance with an embodiment of the present invention. The profile of the periodic grating varies in the z-direction as a function of the x-y profile. By comparison, the term "two-dimensional structure" is used herein to refer to a structure having an x-y profile that varies in only one dimension in addition to a depth in the z-direction. For example, FIG. 4B depicts a periodic grating 402 having a profile that varies in the x-direction but not in the y-direction, in accordance with an embodiment of the present invention. The profile of the periodic grating varies in the z-direction as a function of the x profile. It is to be understood that the lack of variation in the y-direction for a two-dimensional structure need not be infinite, but any breaks in the pattern are considered long range, e.g., any breaks in the pattern in the y-direction are spaced substantially further apart than the brakes in the pattern in the x-direction. In another aspect, a set of diffraction orders is simulated for a structure having both a three-dimensional aspect and a two-dimensional aspect, as described below in association with FIG. 6. Thus, in accordance with an embodiment of the present invention, simulating the set of diffraction orders includes simulating the set of diffraction orders for a structure such as, but not limited to, a two-dimensional structure, a three-dimensional structure, or a structure having both a three-dimensional component and a two-dimensional component.

In accordance with an embodiment of the present invention, the set of diffraction orders is simulated to represent diffraction signals from a structure generated by an ellipsometric optical metrology system, such as the optical metrology system 700 described below in association with FIG. 7. However, it is to be understood that the same concepts and principles equally apply to the other optical metrology systems, such as reflectometric systems. The diffraction signals represented account for features of the structure such as, but not limited to, profile, dimensions or material composition. In one embodiment, the size of the set of diffraction orders, i.e. the number of diffraction orders initially simulated, is of finite size and greater than the number of diffraction orders needed computationally to satisfactorily generate a representative spectrum based on the set of diffraction orders.

Referring to operation 304 of flowchart 300, a set of diffraction efficiencies for the set of diffraction orders is determined. In accordance with an embodiment of the present invention, the set of diffraction efficiencies for the set of diffraction orders is determined by using modified Legendre polynomial high-order finite element discretization. In accordance with another embodiment of the present invention, the set of diffraction efficiencies for the set of diffraction orders is determined by using a rigorous coupled wave approach.

Referring to operation 306 of flowchart 300, a rational approximation is applied to the set of diffraction efficiencies to obtain a rationally approximated set of diffraction efficiencies. In accordance with an embodiment of the present invention, the rational approximation is implemented with a block tridiagonal solver. Referring to operation 308 of flowchart 300, a simulated spectrum is provided based on the rationally approximated set of diffraction efficiencies. In accordance with an embodiment of the present invention, a regress analysis is performed on the rationally approximated set of diffraction efficiencies prior to providing the simulated spectrum. In one embodiment, performing the regress analysis includes using an analytic Jacobian-based method. In accordance with an embodiment of the present invention, the simulated spectrum is finally compared to a sample spectrum.

Figure 5:
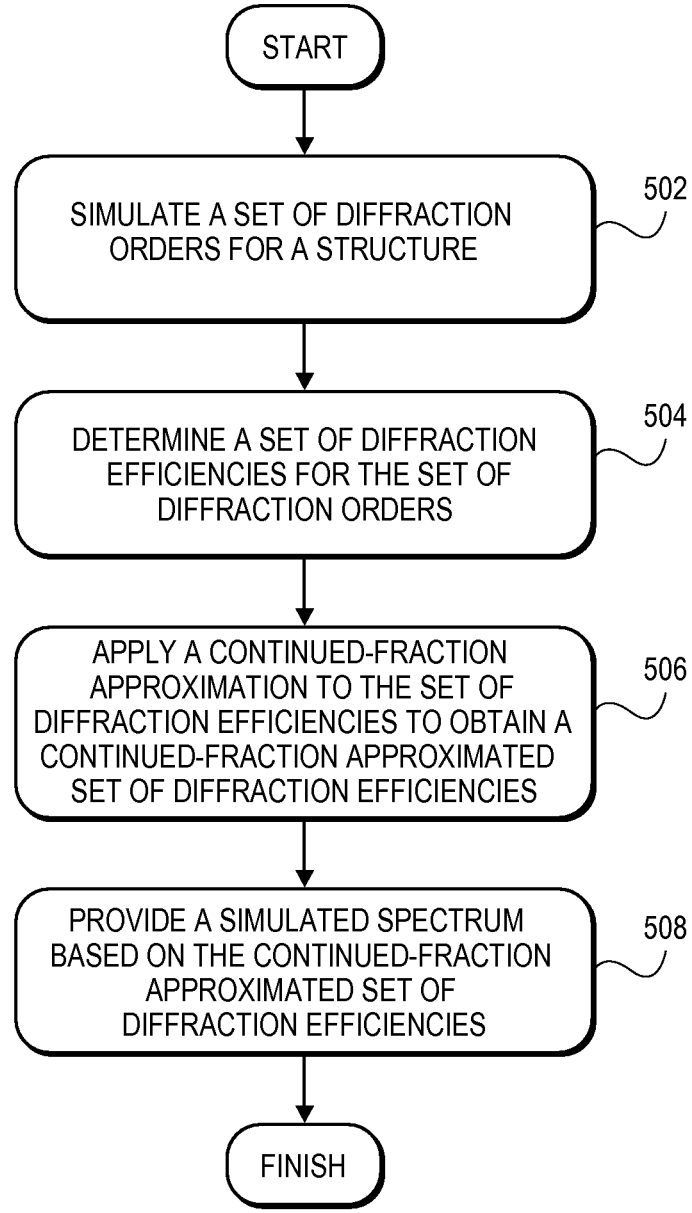
FIG. 5 depicts a flowchart representing an example of a series of operations for improving computation efficiency for simulated diffraction signals in optical metrology, in accordance with an embodiment of the present invention.

In another aspect of the present invention, the computation efficiency for calculations based on diffraction orders, obtained from simulated diffractions signals, is improved for optical metrology applications by using a continued-fraction approximation approach when performing the calculations. FIG. 5 depicts a flowchart representing an example of a series of operations for improving computation efficiency for simulated diffraction signals in optical metrology, in accordance with an embodiment of the present invention.

Referring to operation 502 of flowchart 500, a set of diffraction orders is simulated for a structure. In accordance with an embodiment of the present invention, simulating the set of diffraction orders includes simulating the set of diffraction orders for a structure such as, but not limited to, a two-dimensional structure, a three-dimensional structure, or a structure having both a three-dimensional component and a two-dimensional component. The terms "three-dimensional structure" and "two-dimensional structure" are described above in association with operation 302 of flowchart 300. An example of a structure having both a three-dimensional aspect and a two-dimensional aspect is described below in association with FIG. 6.

In accordance with an embodiment of the present invention, the set of diffraction orders is simulated to represent diffraction signals from a structure generated by an ellipsometric optical metrology system, such as the optical metrology system 700 described below in association with FIG. 7. However, it is to be understood that the same concepts and principles equally apply to the other optical metrology systems, such as reflectometric systems. The diffraction signals represented account for features of the structure such as, but not limited to, profile, dimensions or material composition. In one embodiment, the size of the set of diffraction orders, i.e. the number of diffraction orders initially simulated, is of finite size and greater than the number of diffraction orders needed computationally to satisfactorily generate a representative spectrum based on the set of diffraction orders.

Referring to operation 504 of flowchart 500, a set of diffraction efficiencies for the set of diffraction orders is determined. In accordance with an embodiment of the present invention, the set of diffraction efficiencies for the set of diffraction orders is determined by using modified Legendre polynomial high-order finite element discretization. In accordance with another embodiment of the present invention, the set of diffraction efficiencies for the set of diffraction orders is determined by using a rigorous coupled wave approach.

Referring to operation 506 of flowchart 500, a continued-fraction approximation is applied to the set of diffraction efficiencies to obtain a continued-fraction approximated set of diffraction efficiencies. Starting from the set of equations (2) described above, in accordance with an embodiment of the present invention, a subsequent operation in a continued-fraction approximation utilizes the continued fraction approximation of the function tan(x) in equation (3):

$$\tan(x) = \cfrac{x}{1 - \cfrac{x^2}{3 - \cfrac{x^2}{5 - \cfrac{x^2}{7 - \cfrac{x^2}{\cdots}}}}} \quad (3)$$

In an embodiment, the function tan(x) is written in rational form based on Gaussian quadrature rules according to equation (4):

$$\frac{x}{\tan(x)} = c_0 + c_1 x^2 + \sum_{i=1}^{n} \frac{w_i}{x^2 - z_i} \quad (4)$$

where the coefficients c, the weights w, and the nodes z are obtained using Gaussian quadrature rules. In an embodiment, the term $x^2$ is then replaced by $FGh^2/4$. In that embodiment, the replacement removes the necessity for diagonalization of the matrix FG. For majority of practical applications, only one or two terms will suffice and thus, in an embodiment, are several times faster than diagonalization based formulation. In a specific embodiment, this approach is significantly more accurate than the conventional low order finite difference approximation even when n=0.

Referring to operation 508 of flowchart 500, a simulated spectrum is provided based on the continued-fraction approximated set of diffraction efficiencies. In accordance with an embodiment of the present invention, a regress analysis is performed on the continued-fraction approximated set of diffraction efficiencies prior to providing the simulated spectrum. In one embodiment, performing the regress analysis includes using an analytic Jacobian-based method. In accordance with an embodiment of the present invention, the simulated spectrum is finally compared to a sample spectrum.

Figure 6:
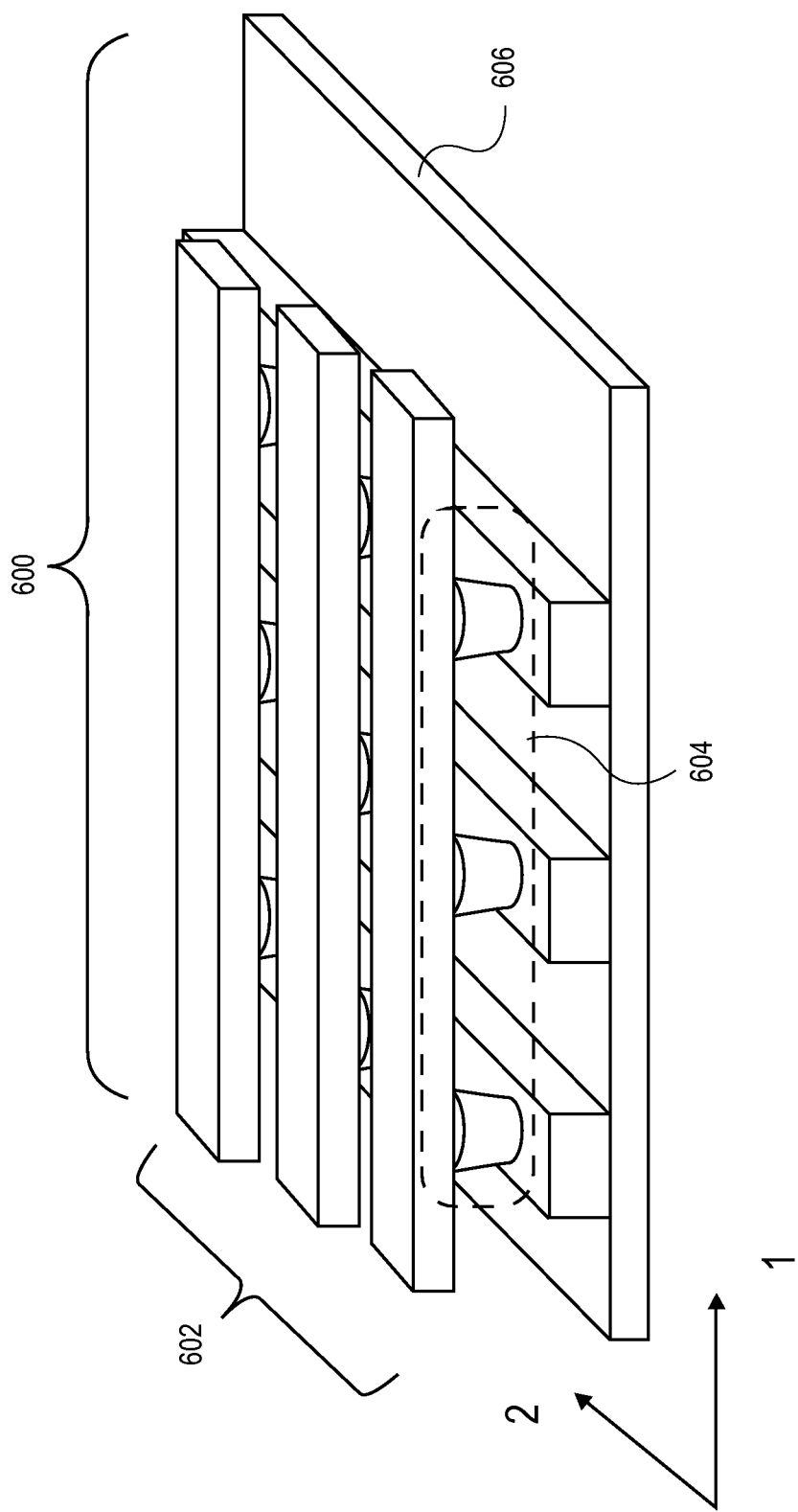
FIG. 6 represents a cross-sectional view of a structure having both a two-dimensional component and a three-dimensional component, in accordance with an embodiment of the present invention.

As described briefly above, in an aspect of the present invention, a structure for analysis includes both a three-dimensional component and a two-dimensional component. The efficiency of a computation based on simulated diffraction data are optimized by taking advantage of the simpler contribution by the two-dimensional component to the over all structure and the diffraction data thereof. FIG. 6 represents a cross-sectional view of a structure having both a two-dimensional component and a three-dimensional component, in accordance with an embodiment of the present invention. Referring to FIG. 6, a structure 600 has a two-dimensional component 602 and a three-dimensional component 604 above a substrate 606. The grating of the two-dimensional component runs along direction 2, while the grating of the three-dimensional component runs along both directions 1 and 2. In one embodiment, direction 1 is orthogonal to direction 2, as depicted in FIG. 6. In another embodiment, direction 1 is non-orthogonal to direction 2. A diffraction simulation is performed based on a three-dimensional approach for all layers in a layered structure. However, in an embodiment, such a simulation is very time consuming. Accordingly, in an embodiment, the particular properties of any two-dimensional layers present in a layered structure, such as the structure illustrated in FIG. 6, are exploited to speed up the diffraction simulation.

As is also described above, in an aspect of the present invention, efficient local optimizers is based on Jacobian computations in real time regression. In an embodiment, such regression is performed by using a finite-difference method. In accordance with an embodiment of the present invention, the computational time in such a method is proportional to the number of parameters computed. Accordingly, in an embodiment, accuracy suffers due to rounding errors in finite precision computations, which is a particularly acute issue for large scale computations. In an embodiment, to eliminate the rounding error problem, fast and accurate analytic Jacobian computations are performed. In one embodiment, in the large truncation order limit, this approach results in $N^{2.5}$ computational time instead of the typical $N^3$ computation time for both RCWA and high order finite difference (or rational approximations).

To illustrate the above concept, in accordance with an embodiment of the present invention, a linear problem $Ax=b$, where A depends on material parameters such as critical dimensions p, is solved. The reflection coefficients are related to one of the components in x. The derivative of x with respect to a parameter p is provided in equation (5):

$$\partial_p x = -A^{-1}\partial_p AA^{-1}b = -A^{-1}\partial_p Ax \quad (5)$$

where b is independent of the parameter p. In one embodiment, the calculation assumes that the matrix A has already been factorized so that all important tasks lie in the calculation of the parameter derivative of the matrix A, which is composed of matrix functions of the matrices F and G in every layer of a structure. These matrix elements are related to the matrix function provided in equation (6):

$$W \equiv \frac{Q/2}{\tan(Q/2)}, \text{ where } Q = \sqrt{FG}\,h \quad (6)$$

In one embodiment, for a general matrix function $f(a)$, where a is a matrix (a lower case is used to distinguish it from the matrix A in the linear system), diagonalization is first performed according to equation (7):

$$a = S\Lambda S^{-1} \quad (7)$$

where S is composed of eigenvectors while $\Lambda$ is composed of eigenvalues. Then, the derivative of a matrix function is derived according to the set of equations (8):

$$\partial_p f(a) = SUS^{-1} \quad (8)$$

$$U_{i,j} \equiv H_{i,j}V_{i,j}, \; H_{i,j} \equiv \frac{f(\lambda_i) - f(\lambda_j)}{\lambda_i - \lambda_j}, \; V \equiv S^{-1}(\partial_p a)S$$

In a specific embodiment, in order to calculate the matrix U, the matrix V is first calculated using two matrix multiplications and, therefore, the operational count is still proportional to $N^3$, albeit much faster than matrix diagonalization. Thus, in an alternative specific embodiment, a low rank representation of the matrix H based on rational approximations is used according to the set of equations (9):

$$f(a) \approx c_0 + c_1 a + \sum_{i=1}^{n} \frac{w_i}{a - z_i} \quad (9)$$

$$f'(a)x = c_1 a'x + \sum_{i=1}^{n} \frac{w_i}{a - z_i} a' \frac{1}{a - z_i} x$$

$$= c_1 a'x - S\sum_{i=1}^{n} \frac{w_i}{\Lambda - z_i} S^{-1} a'S \frac{1}{\Lambda - z_i} S^{-1} x$$

In accordance with an embodiment of the present invention, by using the latter approach, the computational cost is reduced to $3+3nN^2$. In another embodiment, equations (9) are used directly for Jacobian calculations in conjunction with the rational approximations.

In order to facilitate the description of embodiments of the present invention, an ellipsometric optical metrology system is used to illustrate the above concepts and principles. It is to be understood that the same concepts and principles apply equally to the other optical metrology systems, such as reflectometric systems. In a similar manner, a semiconductor wafer is utilized to illustrate an application of the concept. Again, the methods and processes apply equally to other work pieces that have repeating structures.

Figure 7:
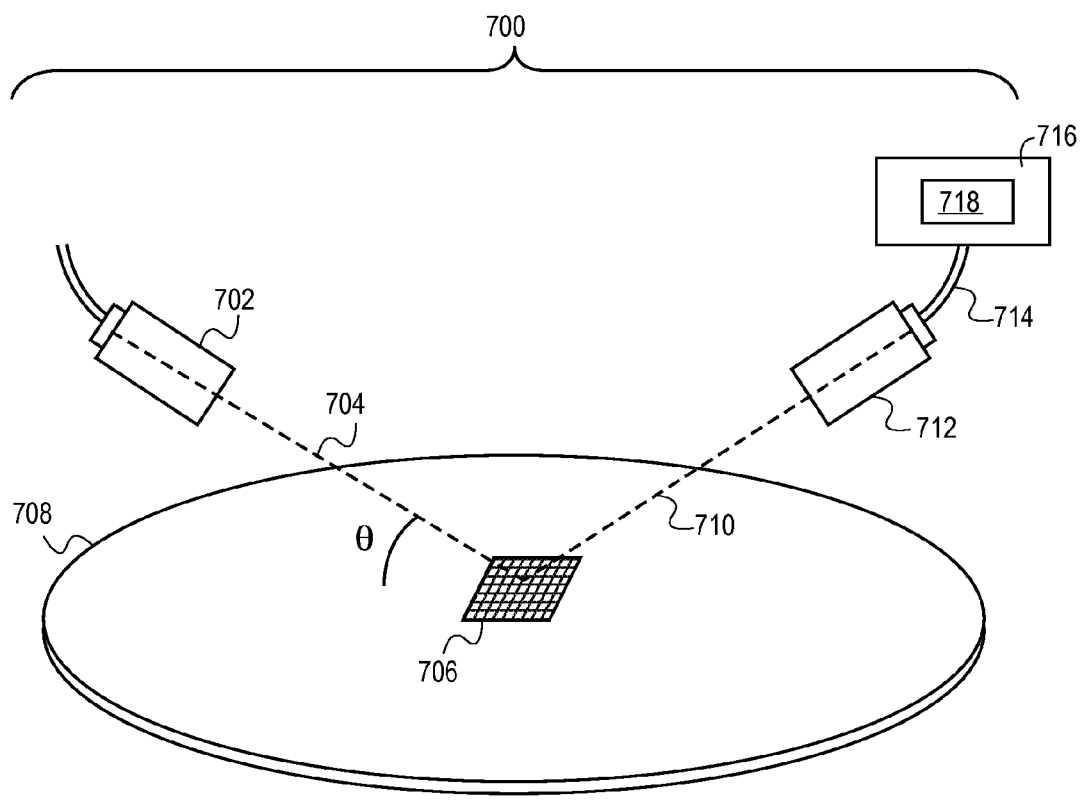
FIG. 7 is an architectural diagram illustrating the utilization of optical metrology to determine the profiles of structures on a semiconductor wafer, in accordance with an embodiment of the present invention.

FIG. 7 is an architectural diagram illustrating the utilization of optical metrology to determine the profiles of structures on a semiconductor wafer, in accordance with an embodiment of the present invention. The optical metrology system 700 includes a metrology beam source 702 projecting a metrology beam 704 at the target structure 706 of a wafer 708. The metrology beam 704 is projected at an incidence angle θ towards the target structure 706. The diffraction beam 710 is measured by a metrology beam receiver 712. The diffraction beam data 714 is transmitted to a profile application server 716. The profile application server 716 compares the measured diffraction beam data 714 against a library 718 of simulated diffraction beam data representing varying combinations of critical dimensions of the target structure and resolution.

In accordance with an embodiment of the present invention, at least a portion of the simulated diffraction beam data is based on a rational approximation approach or a continued-fraction approximation approach. In one embodiment, the library 718 instance best matching the measured diffraction beam data 714 is selected. It is to be understood that although a library of diffraction spectra or signals and associated hypothetical profiles is frequently used to illustrate concepts and principles, the present invention applies equally to a data space comprising simulated diffraction signals and associated sets of profile parameters, such as in regression, neural network, and similar methods used for profile extraction. The hypothetical profile and associated critical dimensions of the selected library 716 instance is assumed to correspond to the actual cross-sectional profile and critical dimensions of the features of the target structure 706. In an embodiment, the optical metrology system 700 utilizes a reflectometer, an ellipsometer, or other optical metrology device to measure the diffraction beam or signal.

In an embodiment, the present invention is provided as a computer program product, or software, that includes a machine-readable medium having stored thereon instructions, which is used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 8:
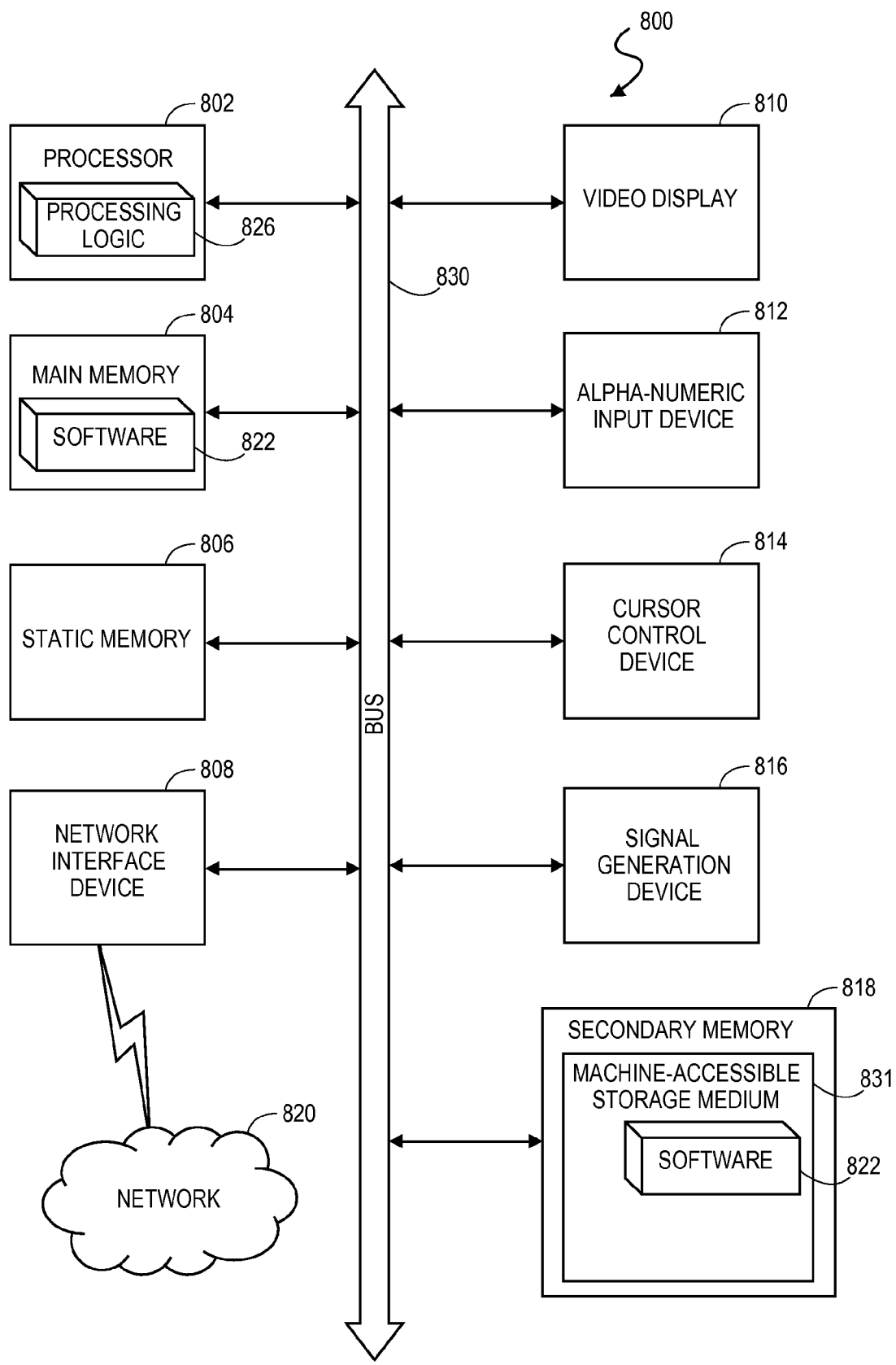
FIG. 8 illustrates a block diagram of an example of a computer system, in accordance with an embodiment of the present invention.

FIG. 8 illustrates a diagrammatic representation of a machine in the form of a computer system 800 within which a set of instructions, for causing the machine to perform any one or more of the methodologies discussed herein, is executed. In alternative embodiments, the machine is connected (e.g., networked) to other machines in a Local Area Network (LAN), an intranet, an extranet, or the Internet. In an embodiment, the machine operates in the capacity of a server or a client machine in a client-server network environment, or as a peer machine in a peer-to-peer (or distributed) network environment. In an embodiment, the machine is a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example of a computer system 800 includes a processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

Processor 802 represents one or more general-purpose processing devices such as a microprocessor, central processing unit, or the like. More particularly, in an embodiment, the processor 802 is a complex instruction set computing (CISC) microprocessor, reduced instruction set computing (RISC) microprocessor, very long instruction word (VLIW) microprocessor, processor implementing other instruction sets, or processors implementing a combination of instruction sets. In one embodiment, processor 802 is one or more special-purpose processing devices such as an application specific integrated circuit (ASIC), a field programmable gate array (FPGA), a digital signal processor (DSP), network processor, or the like. Processor 802 executes the processing logic 826 for performing the operations discussed herein.

In an embodiment, the computer system 800 further includes a network interface device 808. In one embodiment, the computer system 800 also includes a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

In an embodiment, the secondary memory 818 includes a machine-accessible storage medium (or more specifically a computer-readable storage medium) 831 on which is stored one or more sets of instructions (e.g., software 822) embodying any one or more of the methodologies or functions described herein. In an embodiment, the software 822 resides, completely or at least partially, within the main memory 804 and/or within the processor 802 during execution thereof by the computer system 800, the main memory 804 and the processor 802 also constituting machine-readable storage media. In one embodiment, the software 822 is further transmitted or received over a network 820 via the network interface device 808.

While the machine-accessible storage medium 831 is shown in an embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

Thus, a method for improving computation efficiency for diffraction signals in optical metrology has been disclosed. In accordance with an embodiment of the present invention, the method includes simulating a set of diffraction orders for a structure. A set of diffraction efficiencies is then determined for the set of diffraction orders. In one embodiment, a rational approximation is applied to the set of diffraction efficiencies to obtain a rationally approximated set of diffraction efficiencies. A simulated spectrum is then provided based on the rationally approximated set of diffraction efficiencies. In another embodiment, a continued-fraction approximation is applied to the set of diffraction efficiencies to obtain a continued-fraction approximated set of diffraction efficiencies. A simulated spectrum is then provided based on the continued-fraction approximated set of diffraction efficiencies.

What is claimed is:

1. A method for improving computation efficiency for diffraction signals for optical metrology, comprising:
    simulating a set of diffraction orders for a structure, the structure one of a plurality of repeating structures on a wafer;
    determining a set of diffraction efficiencies for the set of diffraction orders;
    applying a matrix rational approximation to the set of diffraction efficiencies to obtain a rationally approximated set of diffraction efficiencies; and
    providing a simulated spectrum for the structure based on the rationally approximated set of diffraction efficiencies;
    generating a sample spectrum from an optical metrology system; and
    comparing the simulated spectrum to the sample spectrum.

2. The method of claim 1, wherein determining the set of diffraction efficiencies for the set of diffraction orders comprises using modified Legendre polynomial high-order finite element discretization.

3. The method of claim 1, wherein determining the set of diffraction efficiencies for the set of diffraction orders comprises using a rigorous coupled wave approach.

4. The method of claim 1, further comprising:
    performing a regress analysis on the rationally approximated set of diffraction efficiencies prior to providing the simulated spectrum.

5. The method of claim 4, wherein performing the regress analysis comprises using an analytic Jacobian-based method.

6. The method of claim 1, wherein simulating the set of diffraction orders comprises simulating the set of diffraction orders for a structure selected from the group consisting of a two-dimensional structure, a three-dimensional structure, and a structure having both a three-dimensional component and a two-dimensional component.

7. A method for improving computation efficiency for diffraction signals for optical metrology, comprising:
    simulating a set of diffraction orders for a structure, the structure one of a plurality of repeating structures on a wafer;
    determining a set of diffraction efficiencies for the set of diffraction orders;
    applying a matrix continued-fraction approximation to the set of diffraction efficiencies to obtain a continued-fraction approximated set of diffraction efficiencies; and
    providing a simulated spectrum for the structure based on the continued-fraction approximated set of diffraction efficiencies;
    generating a sample spectrum from an optical metrology system; and
    comparing the simulated spectrum to the sample spectrum.

8. The method of claim 7, wherein determining the set of diffraction efficiencies for the set of diffraction orders comprises using modified Legendre polynomial high-order finite element discretization.

9. The method of claim 7, wherein determining the set of diffraction efficiencies for the set of diffraction orders comprises using a rigorous coupled wave approach.

10. The method of claim 7, further comprising:
    performing a regress analysis on the continued-fraction approximated set of diffraction efficiencies prior to providing the simulated spectrum.

11. The method of claim 10, wherein performing the regress analysis comprises using an analytic Jacobian-based method.

12. The method of claim 7, wherein simulating the set of diffraction orders comprises simulating the set of diffraction orders for a structure selected from the group consisting of a two-dimensional structure, a three-dimensional structure, and a structure having both a three-dimensional component and a two-dimensional component.

13. A non-transitory computer readable medium containing instructions stored therein for causing a computer processor to perform a method for improving computation efficiency for diffraction signals in optical metrology, the method comprising:
    simulating a set of diffraction orders for a structure;
    determining a set of diffraction efficiencies for the set of diffraction orders;
    applying a matrix rational approximation to the set of diffraction efficiencies to obtain a rationally approximated set of diffraction efficiencies; and
    providing a simulated spectrum based on the rationally approximated set of diffraction efficiencies.

14. The non-transitory computer readable medium as in claim 13, wherein determining the set of diffraction efficiencies for the set of diffraction orders comprises using modified Legendre polynomial high-order finite element discretization or using a rigorous coupled wave approach.

15. The non-transitory computer readable medium as in claim 13, having instructions stored therein for causing the computer processor to perform the method further comprising:
    performing a regress analysis on the rationally approximated set of diffraction efficiencies prior to providing the simulated spectrum, wherein performing the regress analysis comprises using an analytic Jacobian-based method.

16. The non-transitory computer readable medium as in claim 13, having instructions stored therein for causing the computer processor to perform the method further comprising:
    comparing the simulated spectrum to a sample spectrum.

17. The non-transitory computer readable medium as in claim 13, wherein simulating the set of diffraction orders comprises simulating the set of diffraction orders for a structure selected from the group consisting of a two-dimensional structure, a three-dimensional structure, and a structure having both a three-dimensional component and a two-dimensional component.

18. A non-transitory computer readable medium containing instructions stored therein for causing a computer processor to perform a method for improving computation efficiency for diffraction signals in optical metrology, the method comprising:
    simulating a set of diffraction orders for a structure;
    determining a set of diffraction efficiencies for the set of diffraction orders;
    applying a matrix continued-fraction approximation to the set of diffraction efficiencies to obtain a continued-fraction approximated set of diffraction efficiencies; and
    providing a simulated spectrum based on the continued-fraction approximated set of diffraction efficiencies.

19. The non-transitory computer readable medium as in claim 18, wherein determining the set of diffraction efficiencies for the set of diffraction orders comprises using modified Legendre polynomial high-order finite element discretization or using a rigorous coupled wave approach.

20. The non-transitory computer readable medium as in claim 18, having instructions stored therein for causing the computer processor to perform the method further comprising:

performing a regress analysis on the continued-fraction approximated set of diffraction efficiencies prior to providing the simulated spectrum, wherein performing the regress analysis comprises using an analytic Jacobian-based method.

21. The non-transitory computer readable medium as in claim 18, having instructions stored therein for causing the computer processor to perform the method further comprising:
comparing the simulated spectrum to a sample spectrum.

22. The non-transitory computer readable medium as in claim 18, wherein simulating the set of diffraction orders comprises simulating the set of diffraction orders for a structure selected from the group consisting of a two-dimensional structure, a three-dimensional structure, and a structure having both a three-dimensional component and a two-dimensional component.

23. A system for improving computation efficiency for diffraction signals in optical metrology, comprising:
a processor;
a main memory;
a secondary memory having instructions stored thereon which cause the system to perform a method, comprising:
simulating a set of diffraction orders for a structure;
determining a set of diffraction efficiencies for the set of diffraction orders;
applying a matrix rational approximation to the set of diffraction efficiencies to obtain a rationally approximated set of diffraction efficiencies; and
providing a simulated spectrum based on the rationally approximated set of diffraction efficiencies; and
a bus which allows the processor, the main memory and the secondary memory to communicate with one another.

24. The system as in claim 23, wherein determining the set of diffraction efficiencies for the set of diffraction orders comprises using modified Legendre polynomial high-order finite element discretization.

25. The system as in claim 23, wherein determining the set of diffraction efficiencies for the set of diffraction orders comprises using a rigorous coupled wave approach.

26. A system for improving computation efficiency for diffraction signals in optical metrology, comprising:
a processor;
a main memory;
a secondary memory having instructions stored thereon which cause the system to perform a method, comprising:
simulating a set of diffraction orders for a structure;
determining a set of diffraction efficiencies for the set of diffraction orders;
applying a matrix continued-fraction approximation to the set of diffraction efficiencies to obtain a continued-fraction approximated set of diffraction efficiencies; and
providing a simulated spectrum based on the continued-fraction approximated set of diffraction efficiencies; and
a bus which allows the processor, the main memory and the secondary memory to communicate with one another.

27. The system as in claim 26, wherein determining the set of diffraction efficiencies for the set of diffraction orders comprises using modified Legendre polynomial high-order finite element discretization.

28. The system as in claim 26, wherein determining the set of diffraction efficiencies for the set of diffraction orders comprises using a rigorous coupled wave approach.

* * * * *